United States Patent
Pegg et al.

(10) Patent No.: US 9,245,655 B2
(45) Date of Patent: Jan. 26, 2016

(54) METHOD FOR VITRIFICATION OF WASTE

(75) Inventors: Ian L. Pegg, Alexandria, VA (US); Hao Gan, Gaithersburg, MD (US); Keith S. Matlack, Port Republic, MD (US)

(73) Assignee: ENERGYSOLUTIONS, LLC, Salt Lake City, UT (US)

( * ) Notice: Subject to any disclaimer, the term of this patent is extended or adjusted under 35 U.S.C. 154(b) by 165 days.

(21) Appl. No.: 13/470,655

(22) Filed: May 14, 2012

(65) Prior Publication Data

US 2013/0303822 A1 Nov. 14, 2013

(51) Int. Cl.
*A62D 3/30* (2007.01)
*G21F 9/16* (2006.01)
*G21F 9/30* (2006.01)

(52) U.S. Cl.
CPC *G21F 9/162* (2013.01); *G21F 9/16* (2013.01); *G21F 9/305* (2013.01)

(58) Field of Classification Search
CPC . A62D 2101/40; A62D 2101/43; A62D 3/30; G21F 1/06; G21F 1/08
See application file for complete search history.

(56) References Cited

U.S. PATENT DOCUMENTS

| | | |
|---|---|---|
| 4,797,232 A | 1/1989 | Aubert |
| 5,530,174 A | 6/1996 | Kawamura et al. |
| 5,573,564 A | 11/1996 | Richards |

OTHER PUBLICATIONS

International Search Report and Written Opinion, PCT/US2008/76381, Nov. 25, 2008 (8 pp.).
Information about Related Patents and Patent Applications, see the section below having the same title.
U.S. Appl. No. 12/677,490, filed Mar. 10, 2010, Mitigation of Secondary Phase Formation During Waste Vitrification.

*Primary Examiner* — Edward Johnson
(74) *Attorney, Agent, or Firm* — Holland & Hart

(57) ABSTRACT

A method for vitrifying waste to prevent the formation of molybdate secondary phases includes forming a feed mixture that includes the waste, a source of vanadium, and at least one of glass frit or glass forming chemicals and vitrifying the feed mixture in a melter to produce a glass product that includes the waste.

18 Claims, No Drawings

METHOD FOR VITRIFICATION OF WASTE

TECHNICAL FIELD

The following subject matter relates to improvements in the process for vitrifying waste materials, and more particularly, to improvements especially for the vitrification of radioactive waste materials by changing the chemical composition and physical characteristics of additives that are added to the waste material or included in the glass frit to obtain a suitable vitrified product, such that the reactions between the additives and the waste materials suppress the formation of undesirable molybdate secondary phases.

DESCRIPTION OF RELATED ART

Large quantities of radioactive nuclear waste materials that are produced as byproducts from activities such as weapons programs, nuclear fuel recycling, and medical isotope production, are stored in various countries around the world. Vitrification of these waste materials to produce a durable glass product is the preferred approach for treating and disposing of these waste materials because of the high durability of the glass waste form as compared to other waste forms such as grout. Vitrification of radioactive high level waste (HLW) to produce a borosilicate glass product is the internationally accepted waste treatment method. Vitrification of the waste materials is done in melters such as Joule Heated Ceramic Melters (JHCM), Hot Wall Induction Melters (HWIM), Cold Crucible Induction Melters (CCIM), and the like.

In waste vitrification, the waste materials are mixed with appropriate amounts of raw materials, know as "additives", and melted at a high temperature (typically 1150° C. for JHCMs, typically somewhat lower for HWIMs, and typically somewhat higher for CCIMs) in order to produce glass products that meet pre-specified product quality requirements. The product quality requirements mostly relate to the chemical durability of the glass product as measured by standard test procedures.

Many waste materials are stored in tanks in slurry or solution form. The additives are typically used either in the form of pre-melted chemicals (glass frit) with a specified composition, or raw materials in the form of minerals or chemicals. The additive minerals or chemicals are commonly referred to as glass forming chemicals (GFCs). In either case, the waste materials with the additives are designed to melt and form a glass product with a predetermined oxide composition. The waste materials mixed with the appropriate amounts of frit or GFCs are referred to as melter feeds. These materials may be mixed either outside or inside the melter.

In many situations, the melter feed is introduced from the top of the melter to the melt pool surface so that a layer of feed material covers the hot glass melt underneath. This layer is commonly referred to as the cold-cap. The cold-cap extends from partially melted melter feed in contact with the melt pool to unreacted melter feed at the top. In other situations such as batch-style induction melters, the melt zone progresses from the hot wall on the outside into the bulk. Consequently, in this case also there is a boundary zone between predominantly melted material and predominantly unmelted feed material. This zone is also referred to as a cold cap. Reactions in the cold-cap, and controlling these reactions, are a key approach to mitigating undesirable molybdate secondary phase formation.

Due to the complexity of the waste materials, and the number of different constituents, persistent secondary phases are often formed during the melting process. The extent of formation of these secondary phases depends on various factors such as concentrations of troublesome constituents, the types of additives, waste processing rates, processing temperatures, etc.

One of the common waste constituents that show a tendency to form secondary phases during nuclear waste vitrification is molybdenum. Formation of molybdate secondary phases is undesirable because they lead to both processing and product quality issues. Molybdate phases are easily leachable, leading to unacceptable product quality. In addition, these secondary phases tend to selectively incorporate high concentrations of other components such as cesium leading to additional product quality issues. Alkali molybdate phases can accumulate on the melt surface causing excessive corrosion of melter components that are in contact with this phase. Alkaline earth molybdates tend to sink to the bottom of the melter and accumulate. The accumulation of molybdate secondary phases at the melter bottom can cause problems with glass discharge, especially for melters that use a bottom discharge.

The molybdate phase formation is a result of the high molybdenum concentration in the HLW feed to the vitrification facility. The molybdate secondary phase formation initially occurs near the interface between the molten glass pool and the cold-cap. Studies performed at the Vitreous State Laboratory of the Catholic University of America showed that kinetically controlled cold-cap conversion processes are responsible for the generation of molten molybdate salt, rather than solubility limits of molybdates in the underlying glass melt.

When the melter feed is prepared by mixing glass frit or glass forming chemicals with the HLW material in slurry form, or when the HLW and glass frit or glass forming chemicals are fed separately, the molybdate secondary phase tends to form before the underlying glass melt reaches saturation with respect to molybdate. If the feed chemistry can be altered to suppress the molybdate secondary phase formation until its concentration reaches closer to the solubility limit, the amount of waste incorporated into unit amount of glass produced (waste loading) can be increased leading to substantial cost savings in HLW treatment and disposal.

Sulfur is another component in waste streams that at high concentrations causes the formation of secondary sulfate layers during the melting process. In this case also, the secondary sulfate layer is formed well before the underlying glass melt reaches sulfate solubility limit. Again, improvements to the feed chemistry by judicious choice of additives to delay the formation of sulfate secondary phase until the sulfate concentration reaches closer to the solubility limit, has enormous economical advantage. The same principles should be effective for mitigating other troublesome salt-forming species such as chlorine, fluorine, chromium (chromate), and phosphorous. Furthermore, the chemical similarities between sulfate and molybdate lead to interactions that tend to promote the formation of secondary phases when both of these components are present.

SUMMARY

A number of methods are disclosed for the vitrification of waste materials such as radioactive wastes and particularly high level radioactive wastes. The methods improve the efficiency of the vitrification process. The methods may include modifying the glass composition and additives to reduce the tendency to form molybdate secondary phases during vitrification, thereby increasing the amount of waste incorporated into each unit amount of glass produced.

In one embodiment, the method for vitrifying waste to reduce the formation of persistent molybdate secondary phases includes the steps of providing a waste for vitrification; providing a glass frit additive or glass forming chemicals or both for mixing with the waste; providing a source of vanadium; and, feeding the waste, the glass frit or glass forming chemicals or both, and any additives to a melter for vitrification of the waste so that formation of molybdate secondary phases is suppressed.

In a further advantageous embodiment, the method includes selecting the glass frit from the group consisting of glass beads, cylindrical glass fiber cartridges, glass powder, and glass flakes.

In a further advantageous embodiment, the method includes modifying the product glass composition to include vanadium oxide.

In a further advantageous embodiment, the method includes modifying the product glass composition to include no more than 10 wt % vanadium oxide; or no more than 5 wt % vanadium oxide; or no more than 2 wt % vanadium oxide; or no more than 1 wt % vanadium oxide. The glass product may also include at least 0.5 wt % vanadium oxide.

In a further advantageous embodiment, the vanadium oxide is introduced as an additive that is combined with the waste.

In a further advantageous embodiment, the vanadium oxide is introduced by modifying the glass frit composition such that the vanadium oxide is part of the composition of the glass frit.

In a further advantageous embodiment, the source of the vanadium oxide is any convenient vanadium compound that will react and decompose under the high temperature glass melting conditions to produce vanadium oxide that is then incorporated into the glass structure.

In a further advantageous embodiment, the waste and glass frit or glass forming chemicals are fed separately to the melter.

In a further advantageous embodiment, the waste and glass frit or glass forming chemicals are combined to produce a melter feed that is then fed to the melter.

DETAILED DESCRIPTION

In one study, oxide compositions were formed by combining 15.81% of IHI High Level Waste (HLW) simulant and 84.19% of IHI glass frit. The HLW simulant contained about 8.64 wt % of $MoO_3$ for conducting the process discussed herein. The glass composition used in the studies had a waste loading of 15.81 wt %. The resulting glass had $MoO_3$ concentration of 1.37 wt %.

Additives for mixing with the waste material were provided in the form of pre-melted glass frit beads. The 15.81% of IHI HLW simulant is provided in slurry form. Appropriate amounts of IHI glass frit beads, totaling approximately 84.19%, were added so that the resulting glass melt formed the desired oxide composition having the characteristics noted above.

Heat treatment of the mixture in the range of 700 to 900° C. in gradient or isothermal furnaces resulted in the formation of the undesirable molybdate phases. Both alkali and alkaline earth molydates were identified. Even though the nominal operating temperature of a typical glass melter is 1150° C., formation of molydate phases at any temperature in the range of 100 to 1150° C. is of concern because the temperature in the cold-cap region ranges from about 100° C. at the top surface to about 1150° C. at the glass melt interface. To confirm this observation, a continuously-fed joule-heated ceramic melter test was conducted during which about 20 kg of glass was produced over a period of about 64 hours. Samples collected from the melt surface and from the melter floor showed the presence of molybdate yellow phase both on the melt surface and on the melter floor. The surface samples were higher in alkali molybdates whereas the floor samples were higher in alkaline earth molybdates.

Next, a set of tests was designed to identify changes to the above formulation by modifying the glass composition to include vanadium oxide while maintaining all of the glass and melt properties within acceptable ranges for processing and product quality.

Crucible-scale tests were conducted to identify the most promising glass composition modifications to eliminate molybdate phase formation. The waste simulant composition used for these tests was higher in molybdenum, contained sulfate, and was employed at a higher waste loading than was the case for the previous test that showed extensive molybdate secondary phase formation. All of these differences would be expected to significantly increase the tendency for molybdate secondary phase formation. The HLW simulant contained about 7.21 wt % of $MoO_3$ and 1.25 wt % $SO_3$. The glass composition used in the studies had a waste loading of 30.39 wt %. The resulting glass had a $MoO_3$ concentration of 2.19 wt % and a $SO_3$ concentration of 0.38 wt %. It was found that addition of 2.6 wt % $V_2O_5$ in combination with 7.7 wt % $Al_2O_3$ and 2.4 wt % $B_2O_3$ to the high level waste and modification of the frit composition suppressed molybdate phase formation.

In a separate test using the same waste simulant, waste loading, and test conditions as those described above, instead of adding the $V_2O_5$ as a separate ingredient the $V_2O_5$ was first incorporated into the glass frit during the prior melting process used to produce the glass frit. Once again, the addition of vanadium effectively suppressed yellow phase formation.

To confirm this observation, a continuously-fed joule-heated ceramic melter test was conducted during which about 25 kg of glass was produced over a period of about 100 hours. The test used the same waste simulant, additives, and waste loading as those described above. Samples collected from the melt surface and from the melter floor showed no sign of molybdate yellow phase. A further 100 hours of testing was performed and similar samples again showed no signs of molybdate yellow phase. A further 100 hours of testing was performed in which the waste loading was increased to 32 wt %. Again, similar sampling at the end of the test showed no signs of molybdate yellow phase; for this test, the target glass composition had a $MoO_3$ concentration of 2.31 wt % and a $SO_3$ concentration of 0.40 wt %. A further 100 hours of testing was performed in which the waste loading was increased to 34 wt %. Once again, similar sampling at the end of the test showed no signs of molybdate yellow phase; for this test, the target glass composition had a $MoO_3$ concentration of 2.45 wt % and a $SO_3$ concentration of 0.43 wt %.

The above tests conclusively demonstrated that modification of the glass composition to include vanadium oxide is an effective method to suppress the formation and accumulation of separate molybdate phases during HLW simulant feed processing during vitrification.

Different variations of the method that will also improve the suppression of secondary phase formation include: 1) incorporation of a higher or lower amount of vanadium oxide; 2) complete replacement of glass fit with raw chemicals that are added directly to the HLW slurry; 3) incorporation of the vanadium oxide into the glass frit; 4) addition of a vanadium salt that reacts and decomposes to form vanadium oxide under the high temperature glass melting conditions; 5) modification of the glass composition in any of the ways described above to suppress secondary phase formation so that waste loading in the glass can be increased; 7) modification of the glass composition in any of the ways described above where the frit is in the form of glass beads (nominally 2 to 3 mm in diameter); 8) modification of the glass composition in any of the ways described above where the frit is in the form cylindrical glass fiber cartridges (nominally 70 mm diameter and 70 mm length); 9) modification of the glass composition in any of the ways described above where the frit is in the form of a powder (nominally less than 80 mesh); 10) modification of the glass composition in any of the ways described above where the frit is in the form of glass flakes.

The above innovations can be implemented in any and all of the following glass making processes: 1) JHCM in which the glass frit or glass forming chemicals and HLW slurry with the vanadium oxide sources are fed separately to the melter; 2) JHCM in which the glass frit or glass forming chemicals and HLW slurry with the vanadium oxide sources are mixed and fed together to the melter; 3) JHCM in which the glass frit or glass forming chemicals, vanadium oxide sources and calcined HLW are fed to the melter as solid powders; 4) Cold Crucible Induction Melters (CCIM) in which the glass frit or glass forming chemicals and HLW slurry with the vanadium oxide sources are fed separately to the melter; 5) CCIM in which the glass frit or glass forming chemicals and HLW slurry with the vanadium oxide sources are mixed and fed together to the melter; 6) CCIM in which the glass frit or glass forming chemicals, vanadium oxide sources, and calcined HLW are fed to the melter as solid powders; 7) Hot Wall Induction Melters (HWIM) in which the glass frit or glass forming chemicals and HLW slurry with the vanadium oxide sources are fed separately to the melter; 8) HWIM in which the glass frit or glass forming chemicals and HLW slurry with the vanadium oxide sources are mixed and fed together to the melter; 9) HWIM in which the glass frit or glass forming chemicals, vanadium oxide sources, and calcined HLW are fed to the melter as solid powders.

The method has application in the suppression of secondary phases formed by molybdenum and sulfur and the same principles should be effective for mitigating other troublesome salt-forming species such as chlorine, fluorine, chromium (chromate), and phosphorous.

ILLUSTRATIVE EMBODIMENTS

Reference is made in the following to a number of illustrative embodiments of the disclosed subject matter. The following embodiments illustrate only a few selected embodiments that may include one or more of the various features, characteristics, and advantages of the disclosed subject matter. Accordingly, the following embodiments should not be considered as being comprehensive of all of the possible embodiments.

In one embodiment, a method for vitrifying waste to reduce the formation of molybdate secondary phases comprises: providing a waste for vitrification; providing a glass fit additive, a mix of glass forming chemicals, or both for melting with the waste; providing a source of vanadium, either as an additive to the waste or as part of the glass frit composition; and feeding the waste, the glass frit or the glass forming chemicals or both, and the additive to a melter for vitrification of the waste so that formation of molybdate secondary phases is suppressed.

The source of the vanadium is any convenient vanadium compound that will react and decompose under the high temperature glass melting conditions to produce vanadium oxide that is then incorporated into the glass structure. The vanadium source can be introduced as an additive that is combined with the waste or as a separate ingredient. In one embodiment, the vanadium source is introduced by modifying the glass frit composition such that the vanadium is part of the composition of the glass frit. The product glass composition can include up to 10 wt % vanadium oxide; or up to 5 wt % vanadium oxide; or up to 2 wt % vanadium oxide; or up to 1 wt % vanadium oxide.

The waste and glass frit and glass forming chemicals and vanadium source can each be fed separately to the melter or one or more or all of these can be combined together before they are fed to the melter.

In one embodiment, one or more of the components (e.g., glass frit, glass forming chemicals and vanadium source) are combined with the waste before they are fed to the melter and the remaining components are fed separately to the melter. The glass frit can be selected from the group consisting of glass beads, cylindrical glass fiber cartridges, glass powder, and glass flakes.

The method can reduce the formation of molybdate yellow phases and/or the formation of sulfate salt phases. The method can also reduce the formation of salt phases that incorporate molybdate, sulfate, and pertechnetate. The method can reduce the formation of salt with one or more of chlorine, fluorine, chromium (chromate), and phosphorous (phosphate).

The glass can be melted in a Joule Heated Ceramic Melter or a Cold Crucible Induction Melter or a Hot Wall Induction Melter. The waste can be calcined in a separate process step prior to vitrification. The method can increase the waste loading in the glass product.

While a preferred embodiment has been described using specific terms, such description is for illustrative purposes only, and it is to be understood that changes and variations may be made without departing from the spirit or scope of the following claims.

What is claimed is:

1. A method for vitrifying waste comprising:
   forming a feed mixture that includes the waste, a source of stable vanadium, and at least one of glass frit or glass forming chemicals;
   vitrifying the feed mixture in a melter to produce a glass product that includes the waste, wherein the glass product includes no more than 10 wt % vanadium oxide.

2. The method of claim 1 wherein the source of vanadium is an additive that is combined with the waste.

3. The method of claim 1 wherein the source of vanadium is added as a separate component to form the feed mixture.

4. The method of claim 1 wherein the glass frit includes the source of vanadium.

5. The method of claim 1 wherein the source of the vanadium includes a vanadium compound that is capable of reacting and decomposing during vitrification to produce vanadium oxide that is incorporated into the glass product.

6. The method of claim 1 wherein the waste, the source of vanadium, and at least one of glass frit or glass forming chemicals are each fed separately to the melter.

7. The method of claim 1 wherein the waste, the source of vanadium, and at least one of glass frit or glass forming chemicals are combined before being entering the melter.

8. The method of claim 1 wherein at least one of the source of vanadium, glass frit, or glass forming chemicals is combined with the waste before entering the melter and at least one of the source of vanadium, glass frit or glass forming chemicals is fed separately to the melter.

9. The method of claim 1 wherein the feed mixture includes glass frit and the glass frit includes glass beads, cylindrical glass fiber cartridges, glass powder, and/or glass flakes.

10. The method of claim 1 wherein the method reduces the formation of molybdate yellow phases.

11. The method of claim 1 wherein the method reduces the formation of sulfate salt phases.

12. The method of claim 1 wherein the method reduces the formation of salt phases that incorporate molybdate, sulfate, and pertechnetate.

13. The method of claim 1 wherein the method reduces the formation of salt with one or more of chlorine, fluorine, chromium (chromate), and phosphorous (phosphate).

14. The method of claim 1 wherein the melter includes a joule heated ceramic melter or a cold crucible induction melter or a hot wall induction melter.

15. The method of claim 1 comprising calcining the waste in a separate process step prior to vitrification.

16. The method of claim 1 wherein the method increases the waste loading in the glass product.

17. A method for vitrifying high level radioactive waste comprising:
  forming a feed mixture that includes the high level radioactive waste, a source of stable vanadium, and at least one of glass frit or glass forming chemicals;
  vitrifying the feed mixture in a melter to produce a glass product that includes the high level radioactive waste, wherein the glass product includes no more than 10 wt % vanadium oxide.

18. The method of claim 17 wherein the glass product includes vanadium oxide.

* * * * *